2 Sheets--Sheet 1.

J. WILLIAMS.
Horse-Shoe Machines.

No. 159,005.

Patented Jan. 19, 1875.

Attest:
A. L. Van Arsdel.
Wm. W. S. Dryer.

Inventor:
Joseph Williams
By A. C. Johnston
his attorney

2 Sheets--Sheet 2.

J. WILLIAMS.
Horse-Shoe Machines.

No. 159,005. Patented Jan. 19, 1875.

Attest:
A. L. Vanckss.
Wm. W. S. Dyre.

Inventor:
Joseph Williams
By A. C. Johnston
his attorney

UNITED STATES PATENT OFFICE.

JOSEPH WILLIAMS, OF SHARPSBURG, PENNSYLVANIA.

IMPROVEMENT IN HORSESHOE-MACHINES.

Specification forming part of Letters Patent No. 159,005, dated January 19, 1875; application filed October 28, 1874.

*To all whom it may concern:*

Be it known that I, JOSEPH WILLIAMS, of Sharpsburg, in the county of Allegheny and State of Pennsylvania, have invented a certain new and useful Improvement in Horseshoe-Machines; and I do hereby declare that the following is a full, clear, and exact description thereof, reference being had to the accompanying drawings and to the letters of reference marked thereon.

My invention relates to an improvement in machines for making horseshoes; and consists in the combination of shears, dies, clamps, and swages, arranged and operating with relation to each other, as will hereinafter more fully appear.

To enable others skilled in the art with which it is most nearly connected to make and use my invention, I will proceed to describe its construction and operation.

Figure 1:
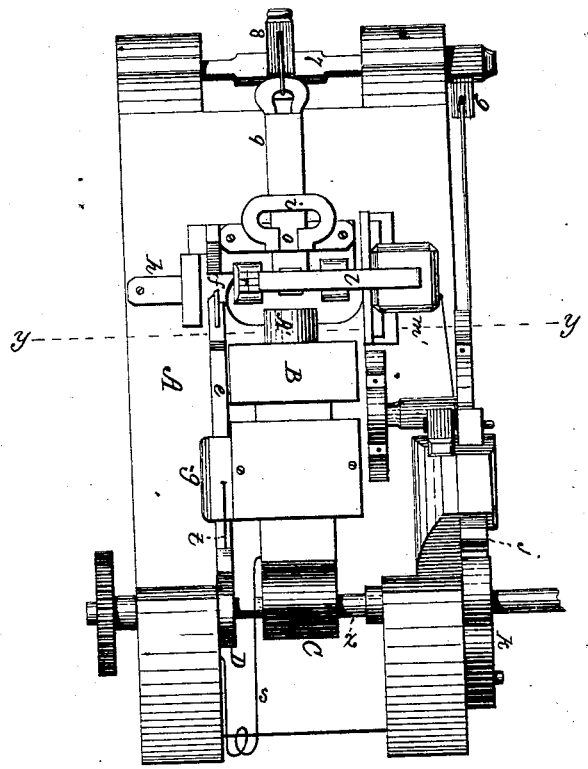
Figure 5:
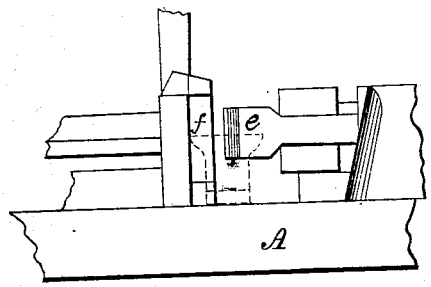
Figure 4:
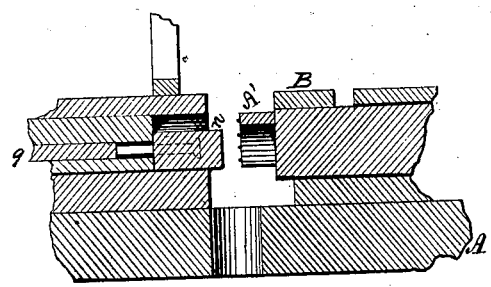
Figures 6, 7:
Figure 2:
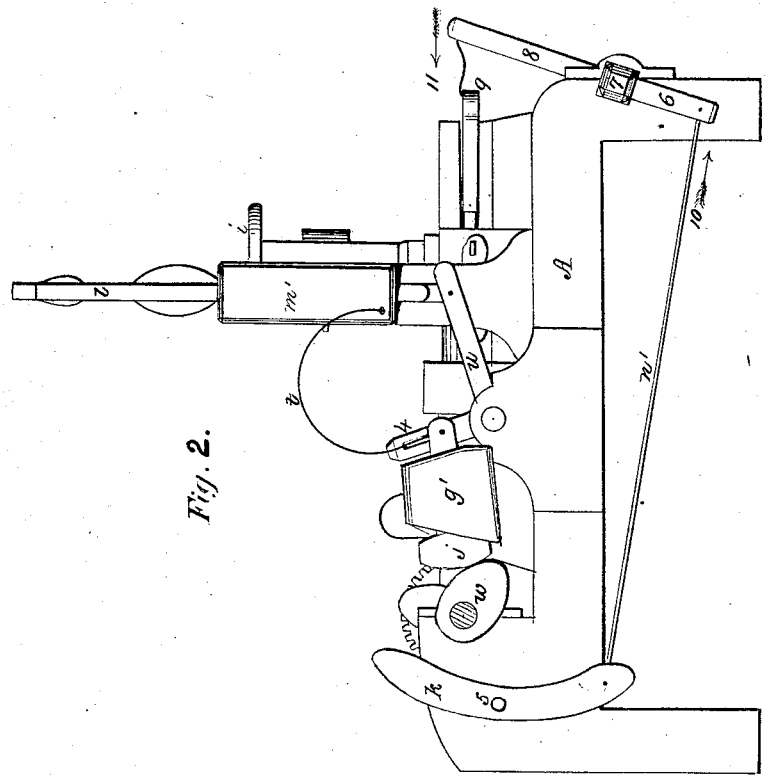
Figure 3:
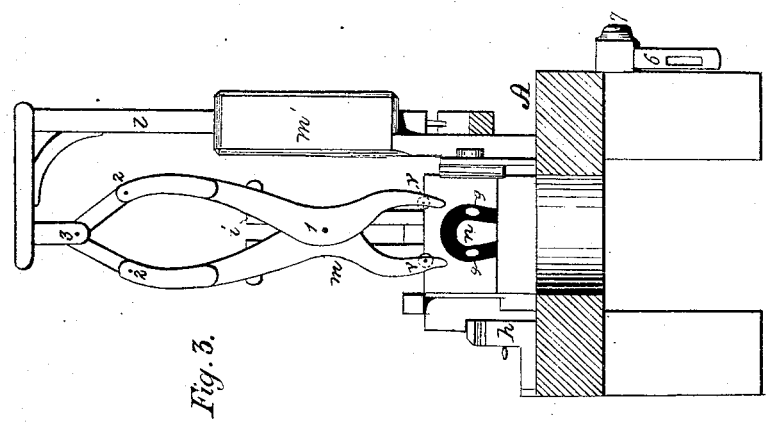

In the accompanying drawings, which form part of my specification, Figure 1 is a top view or plan of my improvement in machine for making horseshoes. Fig. 2 is a side elevation of the same. Fig. 3 is a transverse section at line $y$ of Fig. 1. Figs. 4 and 5 are detail views. Figs. 6 and 7 are face views of the dies.

Referring to the accompanying drawings, A represents the frame of the machine. B represents the swaging-plunger, carrying the swage A′, which is moved forward to its work by means of the cam C, arranged on the driving-shaft $x$, and drawn back through the medium of the spring $s$, the swage A′ attached to the plunger B being so constructed that when in operation it moves over the die $n$, on which the shoe is formed, as shown in Fig. 4. A cam, D, is also arranged upon the shaft $x$, for the purpose of moving forward the cutter or shear-bar $e$, which moves in the guide $g$, and is drawn back from its work by means of the spring $t$. The surface of the die $n$ is similar in shape to that of the ordinary horseshoe, and is arranged partly within a recess of corresponding shape, leaving sufficient space between the two to allow the swage A′ to force the shoe-blank into the recess thus formed, said recess being provided at each side with a delivering-plunger, 9, which is attached to an arm, 8, arranged on the shaft 7, the whole being operated by the cam $w$ on the driving-shaft $x$, which, acting upon the curved arm $k$, pivoted at 5, to which is attached the connecting-rod $n'$ of the arm 6, gives the required motion. The clamps or toggle-levers $m$, used for bending the iron around the die or former $n$, are pivoted at 1 2 3, and are suspended from and operated by the downward motion of the vertical sliding arm $l$, which is arranged to work in the upright guide $m'$, and being operated in its turn by the action of the cam $w$, arranged on the shaft $x$, against the arm $j$, which slides in the guide $g'$, and is attached to the pivoted bell-crank lever $u$, secured to the bottom of the sliding arm $l$, said clamps $m$ being provided with a guide, $o$, adapted to move up and down in the frame $i$ by the action of the sliding arm $l$, and are furnished with friction-rollers $v$, attached to their lower ends, as shown in Fig. 3, for the purpose of facilitating the clamps in their work of bending the iron over and around the die. $h$ represents a rest for holding the iron to be used in the manufacture of the shoes against the anvil $f$, for the shear to cut it off.

The operation of my improved machine is as follows: The iron to be used in the manufacture of the shoes is placed upon the rest $h$ and against the anvil $f$, passing over the upper part of the die $n$, and under the friction-rollers $v$ of the clamps $m$. The driving-shaft $x$ is then put in motion, and the cam D secured thereon forces the cutter or shear bar $e$ forward, and the shear cuts off the iron into the proper length. The cam $w$ then, operating against the arm $j$ and pivoted bell-crank lever $u$, gives the vertical sliding arm $l$, carrying the clamps $m$, a downward motion, and the force of the descending arm, acting upon the pivots 2 2, throws the upper ends of the clamps outwardly, which, acting upon the pivot 1, presses the lower ends of the clamps inwardly toward the die $n$, thereby enabling the clamps, assisted by the friction-rollers $v$, to properly adapt and conform the shape of the iron to the die or former $n$. The arm $l$ and clamps $m$ are then raised up by means of the spring $t'$ acting on the arms 4 of the bell-crank lever $u$. The cam C on the driving-shaft $x$ then moves forward the swaging-plunger B, and the swage A′, moving over the die $n$, forces the shoe-blank back into the recess around the die, and the projections on the swage A' give the shoe the groove and nail-holes while in that position. The plunger and swage are then drawn back by the action of the spring s, and the cam w, acting on the curved arm k, causes the connecting-rod n', attached to the arm 6 on the shaft 7, to move forward in the direction indicated by the arrow 10, which will move forward the arm 8 and delivering-plungers 9, as indicated by the arrow 11, which action forces the formed shoe out from the recess and off the die n, and allows it to drop from the machine, and the plungers 9 and arm 8 are drawn back to their former positions by the action of a spring.

Having thus described the nature, construction, and operation of my improvement in machine for making horseshoes, what I claim as of my invention is—

The combination of the die n, swaging-plunger B, and swage A', clamps m, vertical arm l, bell-crank lever u, arm j, cams C, D, and w, delivering-plunger 9, arms 8 and 6, connecting-rod n', and arm k, constructed, arranged, and operating with relation to each other, substantially as hereinbefore described, and for the purpose set forth.

JOSEPH WILLIAMS.

Witnesses:
  A. C. JOHNSTON,
  JAMES J. JOHSTON.